US005151111A

United States Patent [19]

Tees et al.

[11] Patent Number: 5,151,111

[45] Date of Patent: Sep. 29, 1992

[54] VAPOR RECOVERY SYSTEM FOR VEHICLE LOADING OPERATION

[75] Inventors: Alistair A. Tees, Nederland; Glen E. Kenney, Beaumont, both of Tex.

[73] Assignee: Fina Technology, Inc., Dallas, Tex.

[21] Appl. No.: 739,545

[22] Filed: Aug. 2, 1991

[51] Int. Cl.[5] .................. B01D 53/00

[52] U.S. Cl. .................. 55/164; 55/55; 55/88; 55/189; 55/213; 141/52; 141/59; 141/61; 220/86.1; 220/89.1

[58] Field of Search .................. 55/21, 55, 88, 163, 55/164, 189, 213; 141/52, 51, 59, 61; 220/86.1, 89.1, 749

[56] References Cited

U.S. PATENT DOCUMENTS

| | | | |
|---|---|---|---|
| 3,460,319 | 8/1969 | Tkach | 55/55 |
| 3,867,111 | 2/1975 | Knowles | 55/21 |
| 3,947,258 | 3/1976 | Decker | 55/88 |
| 4,098,303 | 7/1978 | Gammell | 141/52 |
| 4,201,555 | 5/1980 | Tkach | 55/21 |
| 4,701,192 | 10/1987 | Burke | 55/213 |
| 5,040,577 | 8/1991 | Pope | 141/59 |

*Primary Examiner*—Charles Hart

*Attorney, Agent, or Firm*—Michael J. Caddell

[57] ABSTRACT

The present invention discloses a vacuum-assisted vapor recovery system for loading vessels with volatile materials such as liquid hydrocarbons, including gasoline and distillates, which system utilizes a series of interlock premissives and vacuum controllers to maintain a vacuum on the vapor header of the vessel being loaded, which vacuum is within a desired, predetermined level. The system is further arranged and adapted to shutdown the filling of liquids into the vessel should a vacuum leak be detected or should any other malfunction of the vapor recovery system or the liquid filling system arise.

9 Claims, 1 Drawing Sheet

VAPOR RECOVERY SYSTEM FOR VEHICLE LOADING OPERATION

BACKGROUND OF THE INVENTION

The present invention relates to the field of vapor recovery and more particularly involves the recovery of volatile organic compounds (VOCs) during the loading and/or unloading of shipping vehicles, such as trucks, railroad cars, airplanes, and marine vehicles, when such vehicles are being loaded with liquids such as fuels, including gasoline and distillates. The present invention utilizes a vacuum-assisted system controlled by a programmable logic controller to remove and safely handle volatile vapors during the loading and unloading of vehicles.

During the loading of materials such as gasolines and middle distillates, VOCs are displaced and generated, which in most instances generally escape into the atmosphere and contribute to the overall air pollution burden of the geographic area. While governments have mandated air quality standards and attempted to remove such contaminants from the air, one of the pollution sources remains the transfer of liquids such as gasolines and other distillates in loading terminals and in other areas. It has been very difficult to transfer such liquids without the loss of vapors during the transfer process, which loss results in addition of the hydrocarbon material into the ambient air. While the prior art contains many attempts to collect such vapors and prevent their loss into the atmosphere, these efforts have not been entirely successful for several reasons.

One such reason involves the inherent desire of the vehicle operator for rapid loading. In many instances it was found that elaborate recovery systems were being disabled by the vehicle operators in order to speed up the loading operation. The vapor recovery systems were easily bypassed and therefore were ineffective.

Another disadvantage in conventional loading system vacuum recovery units is that they tended to be leaky and were not successful in entrapping all of the escaping vapors. Also, many conventional systems for vapor recovery were found to be extremely dangerous because they created explosive mixtures of vapors and air which were then very difficult to handle.

The present invention overcomes these deficiencies by providing a logic-controlled system having sufficient interlocks to prevent bypassing of the system and sufficient safety features to prevent occurrence to vessel collapse, of dangerous mixtures, or leaking conditions.

SUMMARY OF THE INVENTION

The present invention comprises a vacuum-assisted vapor recovery system for trapping and recovering volatile vapors from fuel loading systems during the loading of transport vehicles. The system is designed to maintain an acceptable vacuum and vapor recovery for the multiple filling of multiple vehicles, each possibly having several different shipping compartments. The present invention has numerous interlocks and safety systems including pressure valves and pressure controllers to prevent inadvertent or deliberate venting of toxic or noxious vapors into the atmosphere and further consists of safety interlocks which prevent operation of the vehicle loading system without the vapor recovery system being fully connected and completely operational. Various pressure sensors and vacuum limiters are provided to maintain a preferred vacuum range on the vehicle being loaded or unloaded, and interlocks are provided to detect a vacuum leak or any dangerous condition which may arise and thereby shutdown the loading system. The vapors recovered are cycled through a recovery system such as absorption/adsorption, or may be passed through a flare to burn them off.

DESCRIPTION OF THE PREFERRED EMBODIMENTS

Figures 1, 2:
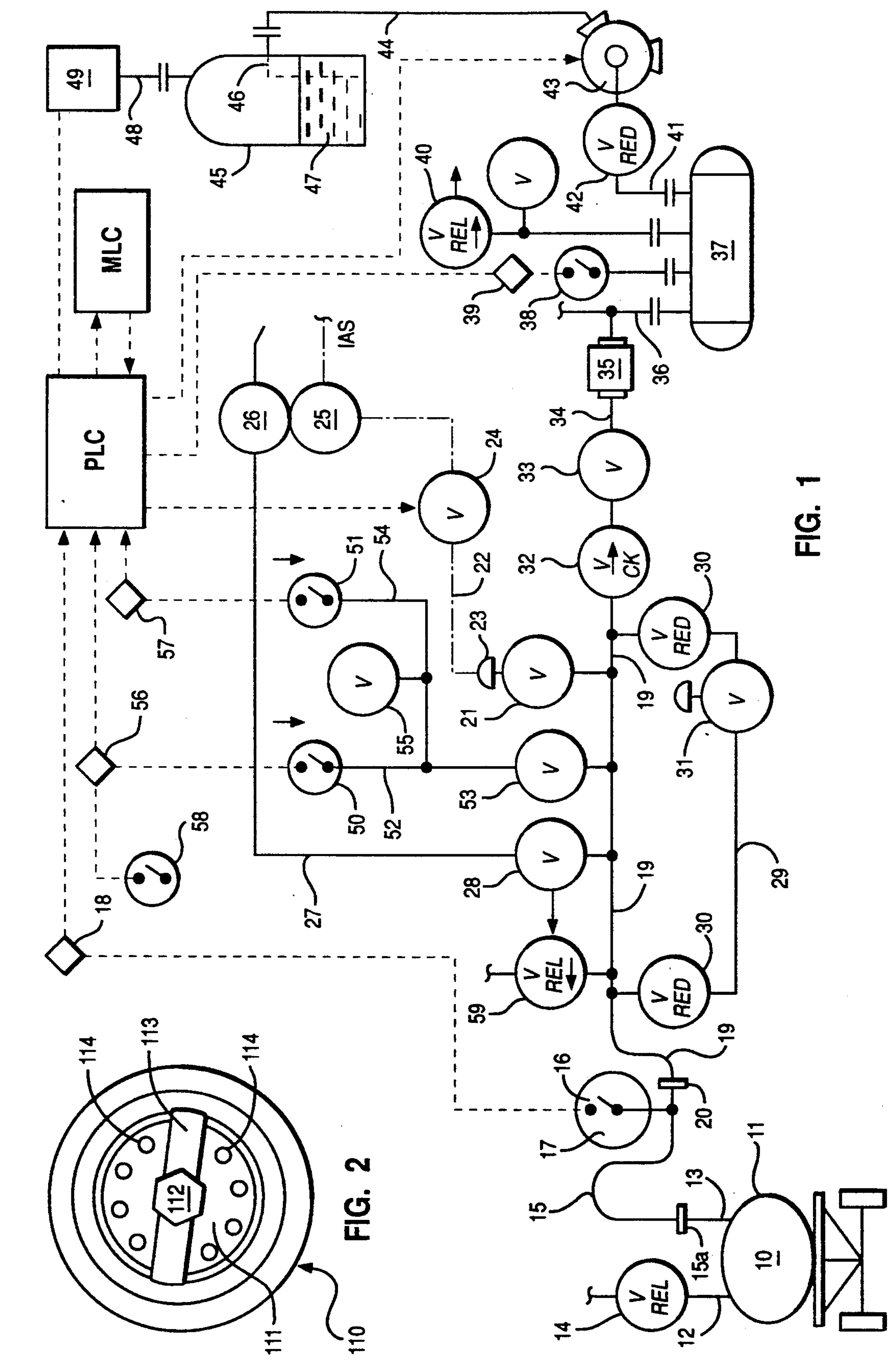
FIG. 1 is a schematic illustration of the entire system of the present invention; and, FIG. 2 is an axial end-view of the vapor hose internal valving system.

Referring now to FIG. 1, which is a schematic illustration of the vacuum recovery system of the present invention, there is disclosed therein a vessel being loaded with fuel containing at least one volatile component, in which instance the vehicle being loaded is illustrated as a tank truck 10. Tank truck 10 consists of a fuel transportation tank 11 having a flanged outlet 12 and a second outlet 13 attached to the top communicating with the interior of tank 11. Flanged outlet 12 has attached thereto a pressure safety valve 14 which consists of a standard relief valve to admit atmosphere into the tank 10 at a certain predetermined vacuum level to prevent inward buckling of the tank by excessive vacuum. In one preferred embodiment, relief valve 14 was set to open at a maximum vacuum level of −10" Water Column (W.C.). Elements 10 through 14 comprise a conventional fuel tank truck such as those often used to transport gasolines and distillates having volatile components thereof such as ethane, methane, propane, and butane.

The vapor recovery system of this invention, which is utilized to remove vapors from the tank truck 10 as it is being filled with volatile components, comprises a vapor removal hose 15 which in one preferred embodiment comprises a heavy rubberized material having a 4" inner diameter with a quick-connect coupler attached for pressure-tight connection to outlet 13 on tank truck 10. Hose 15 has in the end thereof, a modulated mechanical/vacuum activated check valve system as more particularly described hereinafter with respect to FIG. 2.

Also, associated with hose 15 is a vapor hose stow switch 16 in a separate and independent docking station 17. This switch is connected electronically with an interlock permissive 18 which is adapted to generate an electrical signal to the central logic controller PLC which exerts control over the entire vapor recovery system. The logic controller PLC and Miniload controller MLC may be of any commercially available design embodying solid state electronic components and/or electromechanical components adapted to perform the logic and control functions described herein. In one instance, a personal computer (micro-computer or PC) was even utilized as the PLC.

Docking station 17 comprises a dummy hose connection adapted to receive the coupler 15A on the end of hose 15 and is generally configured similarly to the connection on outlet 13 of tank truck 10. Stow switch 16 comprises an electrical switch which is manually operated by connection of coupler 15A in the docking connector 17. When connector 15A is removed from docking connector 17, a signal is generated by interlock switch 18 to the logic controller indicating that the vapor hose has been removed from its permanent docking station and the controller then generates a signal to prepare the vapor vacuum system to begin operation. Further operation of the system logic controller is described in more detail hereinbelow.

Vapor hose 15 is operationally attached to a permanent steel piping system 19 at flange connection 20. The primary vapor recovery piping system 19 is of sufficient size to remove even the heaviest vapor concentrations from the particular vehicle being loaded or unloaded. In the present embodiment which encompasses a gasoline/distillate loading terminal system for tank trucks, it was found that a 4" diameter system was preferred for the main piping assembly.

Connected to main vapor line 19 is the main vapor recovery control valve 21 which is a pneumatically controlled valve having an air control line 22 attached to pneumatic controller portion 23 of the valve. Air line 22 has an electrically controlled solenoid valve 24 arranged to receive electronic actuating signals from the logic controller PLC. In response to actuating signals from the controller PLC, the solenoid valve opens or closes the air supply line 22 to the pneumatic controller 23 of main pressure control valve 21. A pneumatic controller 25 is also located in air line 22 between an instrument air supply IAS and solenoid valve 24. The pneumatic controller 25 is in turn controlled by a pressure differential transmitter 26 attached operably thereto.

Differential pressure transmitter 26 is connected via a vacuum sensing line 27 to main vapor recovery line 19. A manually controlled shut-off valve 28 is located in line 27 between main vapor line 19 and controller 26.

A control loop 29 of vacuum piping is provided around the main vapor recovery control valve 21. Loop 29 passes through reducers 30 and is of a substantially smaller size, having in one preferred embodiment a 2" diameter. Control loop 29 contains a vacuum regulator 31 having a vacuum control valve assembly attached thereto in line 29 allowing initial vacuum to be placed on the tank being loaded and further adapted to control minor vacuum fluctuations which the larger control valve 21 is incapable of controlling. The provision of vacuum regulator 31 in the comparatively small flow line 29 is intended to sense leaks and other unsafe conditions in the tank truck hookup and is an initial vapor system, mainly provided to establish proper conditions to initialize the main control valve 21. Vacuum regulator 31 establishes proper vacuum level in the header 19 which will trigger the minimum vacuum permissive switch 51, sending a signal to the PLC. This then allows opening of solenoid valve 24 and activation of main valve 21.

The flow line 19 leaving main control valve 21, then passes through a one-way check valve 32 and into an expander 33 which goes from the diameter of flow line 19 into a larger diameter main flow line 34, which in the present embodiment, is preferably 6" in diameter. Main flow line 34 then passes through a flame arrestor 35 and into a larger collection pipe 36. Collection pipe 36 in the present embodiment is preferably in the range of 12" in diameter and is connected to a knock-out tank 37. Knock-out tank 37 is provided to remove any condensable vapors, especially water, from the vapor flow removed from the tank truck. The knock-out tank is also capable of removing heavy condensable hydrocarbon vapors that may be present in the vapor stream and is used primarily to prevent entrained water and condensables from snuffing out the flame in the flare.

Knock-out tank 37 has attached thereto a liquid level switch 38 which is a high/high sensing switch for determining when the liquid level of the knock-out tank exceeds a certain level and thereby initiate a signal to interlock permissive 39. Upon reaching a certain predetermined high level, an alarm will be sounded by switch 38, and upon reaching a second higher level or "high/high" level, a second signal will be initiated to interlock permissive 39 which will then communicate a shutdown signal to the logic controller PLC. Upon fluid reaching the high/high level in the knock-out tank, the loading system is shutdown until the liquid level has been vacuumed out or removed by other means to a point below the high/high level.

A pressure relief valve 40 is also located operably in tank 37 at the top thereof for preventing dangerous pressure build-up in the knock-out tank. At the opposite end of tank 37 is a main vapor disposal line 41 of generally equivalent size to line 36. This line communicates by means of a reducer 42 to a vapor suction fan 43. Vapor suction fan 43 is sized to provide sufficient suction, in the range of up to −12" or more W.C. water column vacuum in line 41.

The vapors removed from the system by vapor suction fan 43 are then transmitted by line 44 to a water seal vessel 45 whereupon the vapors enter the side of the vessel through entry line 46, pass downward to the bottom end of the vessel, and bubble up through water level 47 in the water seal vessel. Vapors are then passed through exit line 48 to a flare or other disposal means 49 for permanent removal. In those geographical parts of the country where flaring of hydrocarbons is allowed, a flare is used to dispose of the vapors, but in other geographical areas other removal means such as chemical absorbents or compression and condensation may be used.

In addition to these flow components in the main vapor recovery loop, there is a pressure switch system comprising a low/low pressure switch 50 and a low pressure switch 51. Low/low pressure 50 is connected by connection line 52 through a manually operated valve 53 to main vapor recovery line 19. The low pressure switch 51 likewise is connected through line 54 and manual valve 53 to main vapor recovery line 19. A test valve 55 is provided in line 54. The vacuum existent in line 19 is sensed via lines 52 and 54 by the pressure switches 50 and 51. Pressure switch 50, which is the low/low pressure switch is electronically connected to interlock permissive 56 and low pressure switch 51 is electronically connected to interlock permissive 57. These two interlock permissives are in turn electronically connected to the logic controller PLC. In addition, a hand switch 58 is electronically connected to interlock permissive 56. This basically describes the flow line portion of the vapor recovery system and the various interfaces between the vapor recovery system and the logic system, which is more particularly described hereinbelow.

The logic system consists primarily of a solid state or other type of computerized logic controller PLC which is operably connected by electronics to the various flow control elements described hereinabove. More specifically, the logic controller is electronically connected by permissive interlock 18 to the stow switch 16, by interlock permissive 56 to the low/low level pressure switch 50, by interlock permissive 57 to the low level pressure switch 51, by solenoid valve 24 to the pneumatic air supply 22, by interlock permissive 39 to the knock-out tank liquid level switch, by electronic communication with the on/off switch of the vapor suction fan 43 and by two-way electronic communication with a miniload controller MLC.

The miniload controller is a filling and set stop controller provided for each of the terminal filling stations and has setable dials or other type instruments to allow the operator of the loading terminal to dial in the gallonage to be filled in each vessel being loaded. Also, the miniload controller has the ability to require certain passwords or code words or account numbers for activation of the logic controller PLC. In addition the PLC is electronically connected bi-directionally to flare 49 to provide activation of the flare pilot light and initiation of the flare during the vapor recovery process, and also to send a signal to the PLC to shut down loading if the flare should go out unexpectedly.

Mode of Operation

In typical operation mode, the operator of a vessel to be loaded such as a tank truck 10 pulls up into the loading terminal and removes the main vapor hose 15 from the vapor hose docking station 17 and attaches the vapor hose coupler 15*a* to the tank truck vacuum line 13. The tank truck operator will then connect the main product filling hose (not shown) to the main filling valve of the vessel, usually located along the bottom of the tank on the truck. Upon removal of the vacuum hose from the docking station 17, the mechanical stow switch 16 is actuated which initializes interlock permissive 18 and signals the logic controller PLC that a vessel is about to be loaded. The logic controller then signals the vapor suction fan 43 which starts the fan running and begins generating a vapor suction in the main flow lines 19, 29, 36, and 41. This begins to pull an initial vacuum on the truck tanks and also initiates startup of the flare 49. The miniload controller then initiates the filling system and filling of the fuel or liquid hydrocarbon then begins at the filling manifold along the bottom of the truck (not shown). If the vapor connection 15 is not made to the truck, the system is not running and is in a shutdown mode which means that the vapor suction fan is not running, no vacuum on the system is pulled and there are no permissive outputs from the PLC to the MLC for the filling. As mentioned above, when the vapor hose is removed from the stow station 17, the stow switch initiates the permissive interlock 18 which then communicates a permissive input to the PLC. This in turn initiates a start up of the vapor suction fan by the PLC by signal generated to the fan controller. If a high/high liquid level is present in the knock-out drum 37, the input to the PLC from switch 38 blocks the output to the controller and prevents loading. The fan is also stopped by the PLC output when the vapor hose is re-stowed in the docking station 17. In addition to this control feature, a loop control system comprising valves 50 and 51 brackets a vacuum level at which the system can be operated. Valve 50 which is the low/low pressure switch is set to close at a vacuum level exceeding −8.5″ W.C. The low pressure switch 51 is set to close when the vacuum drops below −4″ W.C. Should either switch 50 or 51 close in response to too much vacuum or insufficient vacuum, they will generate signals to permissive interlocks 56 and 57 respectively which in turn will signal the controller PLC to shutdown loading. The PLC then generates a signal to stop the vacuum fan which shuts down the system by loss of permissive from the pressure switches 50 and 51. This in turn will generate a shutdown system to the miniload controller MLC which will shut down the pumps pumping the liquid product into the tank 10.

After initiation of the vacuum startup by initiating vacuum suction fan 43, a vacuum is pulled on valves 21 and 31. Valve 21 is in a normal closed position since the signal from its controller is blocked by solenoid valve 24. The vacuum regulator valve 31 is set to maintain −5″ W.C. on the truck header and opens to pull this level vacuum on the truck tanks. The valve capacity of valve 31 is selected to be ample to pull −5″ W.C. on the closed tank compartments. However, should a hatch or tank valve be open on the truck being loaded, an amount of outside air will be introduced which exceeds the valve capacity and falls outside the permissive vacuum level of −4.0″ W.C. set in the low pressure switch 51, shutting the system down.

If no major leaks are present in the tanks or the vacuum lines and the permissive level of vacuum is reached, the low level pressure switch 51 closes to make an input to the PLC through interlock 57. This input is necessary for the PLC to make its permissive outputs to the miniload controller which controls the filling operations and allows the fuel product to begin pumping.

Vapor and vacuum control when filling is maintained through coordination of main valve 21, which preferably is a large-capacity butterfly valve operated by pneumatic actuator. The pneumatic actuator is controlled by the pneumatic controller 25 connected to an independent air source, which controller receives its actuation signal from the differential pressure transmitter 26. Transmitter 26 measures the differential pressure in inches of W.C. between the suction header and atmosphere and transmits a proportional pneumatic signal to the controller 25. The variable setpoint for controller 25 is adjusted to −7.5″ W.C. and transmits a signal of from 3 to 15 Psi air to valve 21 to control the valve operation and maintain a vacuum level of about −7.5″ W.C. in the truck header.

The capacity required for valve 21 to handle a maximum vapor requirement and maintain the required vacuum is large by comparison to that of the regulator valve 31. Because of this large capacity, it would not be able to detect leak conditions were it operable during the initial vacuum stage. For this reason its signal from the controller is blocked until vacuum is established and filling begins. The truck tanks are all open to a common vapor recovery header on the truck, therefore regardless of the filling rates or the number of tanks being filled, the vacuum in all tanks is maintained essentially the same within specified ranges.

When filling of the tank truck 10 is initiated by the miniload controller MLC, a pump request output signal is made to the PLC. Upon receipt of such an input, the PLC will make an output to energize the solenoid valve 24 which closes the actuator for valve 21 and unblocks the signal allowing the valve to modulate open in response. When the set amount for the miniload controller is reached, all pump request inputs will be disabled and the PLC output to solenoid 24 is switched off thereby closing this valve. The higher level vacuum reached during the vapor recovery stage will be above the set point level of the vacuum regulator 31 and it will be closed as long as valve 21 is open. The pneumatic controller preferably is an indicating controller which gives a visual indication of the vacuum level. Preferably it is also of the proportional, integral, derivative type, which allows close control by fine tuning of its functions.

The vapor recovery system and the vessel being loaded are both protected by safety relief valves including the safety relief valve 14, commonly associated with a tank truck, normally set at about −10″ W.C., a safety relief valve 59 located in line 19 normally set at about −9″ W.C. and a positive pressure relief valve 40 located o the knock-out tank. It should be noted that valve 40 is intended to relieve a blocked line pressure build-up which might occur with the system in a shut-down mode. Vacuum relief is not necessary in the knock-out drum, since the drum construction is rated for much higher vacuum than what would be obtainable with the vapor suction fan 43.

Advantages of the Invention

The present system is designed to initially pull a vacuum on a vessel being loaded and to continuously monitor the vacuum. Through permissive interlocking, the control action prevents initiation of the filling if vacuum is insufficient and will stop filling once vacuum is lost. A vacuum preventing situation, such as a open hatch or open tank valve, also can be detected and a reaction will occur in response thereto. During filling of the vessel, the vacuùm will be automatically controlled to the level necessary for known filling rates and temperatures encountered. A differential pressure transmitter/controller is utilized between the tank truck and the vacuum control valve to continuously measure the system vacuum and proportionally control the valve to maintain a vacuum set point. The amount of vacuum is visually indicated on the controller scale. The instrumentation and relief valves typically operate in the −8.5″ W.C. to −10″ W.C. range to protect the truck against a damaging high vacuum, should there be an equipment malfunction. A vapor suction fan is utilized to provide the necessary vacuum and discharge the vapors to a flare, through a water seal. The relief valve setting is −8.5″ W.C. in the vapor collection system.

The system logic is controlled by a programmable logic controller (PLC) which receives the system operational level inputs, issues permissives to the miniload controller filling system, and makes the control outputs to the vapor system equipment and devices. The controllers are programmed to maintain vacuum on the tanks during loading operation and if vacuum is lost for any reason, the controllers shut off the feed from the liquid pumps which are filling the tanks.

In the present embodiment, the preferable vacuum vapor recovery conditions are attained from maximum vapor generation conditions of filling three gasolines and one middle distillate product simultaneously, each at about 600 gallons/per minute rate, with a product temperature of around 95° F. During filling, a continuous vacuum of about −7.5″ W.C. will be maintained on the vapor recovery header at the point of vapor hose attachment on the vehicle. The minimum vacuum maintained in any tank under maximum filling and vapor conditions should be in the range of about −1″ W.C. The difference in header and tank vacuum arises from a pressure drop through the truck vapor head and vapor hose. For the same filling conditions during winter months with less vapor generated due to the lower temperatures, the minimum vacuum in any truck tank should be around −4″ W.C.

Thus the present invention provides a vapor recovery system with pneumatic and electronic controls, controlled centrally by a logic controller to maintain an acceptable vacuum level on the vessel being filled and to shut down the system for any conceivable contingency, such as a leak in the vessel being filled, or loss of vacuum in any part of the system or in the vessel. The vacuum levels preferably are maintained between about −4″ W.C. and about −9.5″ W.C. The system provides valving to remove the vapor from the vessel being filled, strip the condensables from the vapor, and run the vapor through a vacuum suction fan and a water seal to a flare or other removal system. The entire vapor recovery system provides interlocks with the filling system such that at any point the vapor recovery system malfunctions or is attempted to be bypassed, filling of the liquid hydrocarbon in the vessel will cease immediately. Other safety features include a stow switch system which prevents the operator of the vessel from leaving the loading terminal until the vapor recovery valve has been replaced in the stow docking station. The stow switch 16 operating through controller PLC prevents a printout of the invoice through the miniload controller MLC for the hydrocarbon which was loaded unless the stow switch has been activated by reconnection of the vapor line 15 thereto. In addition, other safety features include a ground cable and overfill protection system conventionally utilized in loading terminals which requires a reconnection of this cable to the terminal cable outlet before the vessel can be removed from the terminal. This too controls printout of the invoice through the miniload controller MLC.

FIG. 2 illustrates an axial end view of the valve assembly 110 located in the end of the vapor hose flange connector 15*a.* Valve assembly 110 comprises a spring loaded pop valve which consists mainly of a plate 111 which is biased in a closing position by a spring held on a threaded rod 112 and biasing against a cross bar 113 against plate 111. Plate 111 also has a circular "O" ring (not shown) for sealing engagement in the flange 15*a.* In normal unconnected orientation, plate 111 will be sealingly biased against flange 15*a* by spring action of the spring on bolt 112. When engaging in a filling flange such as that indicated at 12 in FIG. 1, contact is made with the plate 111 through bolt 112 which forces the plate axially into the vacuum hose and provides an annular opening around the edge of plate 111. Upon removal of flange 15*a* from the vessel being loaded, bolt 112 is disengaged and the spring behind it forces the plate back into sealing engagement. This is a normal pop valve configuration commercially available and utilized extensively in vapor recovery systems. In the present invention however, this plate has been modified by the formation of several pressure relief holes indicated at 114 passing through the valve plate 111 and allowing the loss of vacuum through the plate. It was found during early experimentation with the present invention that the vessel operator could bypass the safety features of the system by removing the vacuum hose from the docking station 17 which thus resulted in closing of valve plate 111 and indicated to the system that a vacuum existed in the vapor line. The provision of relief openings 114 thus prevented this situation from arising since this indicated to the system that a vacuum leak was occurring, and the low level pressure valve 51 shut down the system. Since the system is arranged to detect a vacuum loss of approximately one square inch flow area, the equivalent flow area of holes 114 should exceed that of a round opening of about one square inch. Thus if the vapor hose is removed from the docking station, it will not indicate a false signal and could only be initiated by connection to the tank and actual vacuum conditions in the tank being loaded.

What is claimed is:

1. A vapor recovery system for filling systems in vehicle loading terminals, adapted to collect and remove vapors from vehicles as they are being loaded with volatile substances; said recovery system comprising:

vapor recovery piping adapted to be sealingly connected to a vehicle transport tank;

a vacuum generator attached to said piping and adapted to pull a vacuum in said piping and thereby on said vehicle transport tank;

valving in said piping adapted to control vacuum therein;

actuators on said valving adapted to operate said valving between open and closed positions;

a logic controller connected to said actuators and adapted to activate said actuators to maintain a predetermined desirable level of vacuum in said piping and said vehicle transport tanks in the range of about −4" to about −12" W.C.; and, a vapor collection assembly at the end of said piping arranged to receive said recovered vapor and dispose thereof.

2. The vapor recovery system of claim 1 wherein said logic controller is operably connected to the filling systems and is adapted to shut down said filling systems if a predetermined desirable vacuum is not maintained on said vehicle being loaded and further adapted to shut down said filling system upon any malfunction of said vapor recovery system.

3. The vapor recovery system of claim 2 wherein said vapor recovery piping includes an interlock switch system on said piping in conjunction with said sealing connection to said vehicle wherein said switch system initiates startup of said vapor recovery system when sealingly engaged with a vehicle being loaded and shuts down said filling system when sealing engagement with said vehicle is lost.

4. The vapor recovery system of claim 3 further comprising relief valves in said system arranged to prevent the vacuum generated therein from exceeding a predetermined maximum value.

5. A vapor recovery system for filling systems in vehicle loading terminals, adapted, in the absence of a blanketing gas, to collect and remove vapors from vehicles as they are being loaded with volatile substances; said recovery system comprising:

vapor recovery piping adapted to be sealingly connected to a vehicle transport tank;

a vacuum generator attached to said piping and adapted to pull a vacuum in said piping and thereby on said vehicle transport tank;

valving in said piping adapted to control vacuum therein;

actuators on said valving adapted to operate said valving between open and closed positions;

a logic controller connected to said actuators and adapted to activate said actuators to maintain a predetermined desirable level of vacuum in said piping and said vehicle transport tanks; and, a vapor collection assembly at the end of said piping arranged to receive said recovered vapor and dispose thereof.

6. A vapor recovery system for filling systems in vehicle loading terminals, adapted, in the absence of a blanketing gas and oxygen sensing means, to collect and remove vapors from vehicles as they are being loaded with volatile substances; said recovery system comprising:

vapor recovery piping adapted to be sealingly connected to a vehicle transport tank;

a vacuum generator attached to said piping and adapted to pull a vacuum in said piping and thereby on said vehicle transport tank;

valving in said piping adapted to control vacuum therein;

actuators on said valving adapted to operate said valving between open and closed positions;

a logic controller connected to said actuators and adapted to activate said actuators to maintain a predetermined desirable level of vacuum in said piping and said vehicle transport tanks in the range of about −4" to about −12" W.C.; and, a vapor collection assembly at the end of said piping arranged to receive said recovered vapor and dispose thereof.

7. A vapor recovery system for filling systems in vehicle loading terminals, adapted to collect and remove vapors from vehicles as they are being loaded with volatile substances; said recovery system comprising:

vapor recovery piping adapted to be sealingly connected to a vehicle transport tank;

a vacuum generator attached to said piping and adapted to pull a vacuum in said piping and thereby on said vehicle transport tank;

valving in said piping adapted to control vacuum therein;

actuators on said valving adapted to operate said valving between open and closed positions;

a logic controller connected to said actuators and adapted to activate said actuators to maintain a predetermined desirable level of vacuum in said piping and said vehicle transport tanks;

a vapor collection assembly at the end of said piping arranged to receive said recovered vapor and dispose thereof; and, a stow switch system arranged to shut down loading and vapor recovery when the system is not connected to a vehicle transport truck, said system containing switch means engagable by a loading nozzle for indicating when the loading nozzle is stowed in a non-filling relationship, and said system further comprising vacuum regulatory orifices therein for preventing operator bypass of the loading system shut down.

8. The vapor recovery system of claim 7 further comprising a vacuum bracketing assembly comprising a plurality of vacuum permissive switches interconnected to said logic controller and adapted to maintain vacuum in said vapor recovery piping between about −4" and about −12" W.C..

9. The vapor recovery system of claim 7 further comprising a gallonage controller modular by-directionally operably connected to said logic controller and adapted to activate said logic controller upon receiving a proper coded input from operating personnel, and further adapted to receive a shutdown signal from said logic controller in response to an unacceptable change in the vacuum of said vapor recovery system.

* * * * *